US008687612B2

(12) United States Patent
Menaceur et al.

(10) Patent No.: US 8,687,612 B2
(45) Date of Patent: Apr. 1, 2014

(54) IP COMMUNICATION ARCHITECTURE BETWEEN THE GROUND AND A VEHICLE

(75) Inventors: Djamil-Fayçal Menaceur, Brownsburg-Chatam (CA); Frank Ruffolo, Lorraine (CA)

(73) Assignee: Alstom Transport SA, Levallois-Perret (FR)

( * ) Notice: Subject to any disclaimer, the term of this patent is extended or adjusted under 35 U.S.C. 154(b) by 546 days.

(21) Appl. No.: 12/863,164

(22) PCT Filed: Jan. 16, 2009

(86) PCT No.: PCT/FR2009/050062
§ 371 (c)(1),
(2), (4) Date: Nov. 10, 2010

(87) PCT Pub. No.: WO2009/092973
PCT Pub. Date: Jul. 30, 2009

(65) Prior Publication Data
US 2011/0194541 A1 Aug. 11, 2011

(30) Foreign Application Priority Data
Jan. 16, 2008 (FR) ...................................... 08 50252

(51) Int. Cl.
*H04W 4/04* (2009.01)
(52) U.S. Cl.
USPC .......................................... 370/338; 370/328
(58) Field of Classification Search
None
See application file for complete search history.

(56) References Cited

U.S. PATENT DOCUMENTS

| | | | |
|---|---|---|---|
| 6,546,259 B1 * | 4/2003 | Vendryes | 455/513 |
| 7,096,090 B1 * | 8/2006 | Zweig | 700/245 |
| 7,522,567 B2 * | 4/2009 | Cheon | 370/338 |

(Continued)

FOREIGN PATENT DOCUMENTS

| | | |
|---|---|---|
| EP | 1292074 | 3/2003 |
| EP | 1705810 | 9/2006 |
| WO | 2005/022839 | 3/2005 |

OTHER PUBLICATIONS

Albrecht et al.:"IP Services over Bluetooth: Leading the Way to a New Mobility," Local Computer Networks, 1999. LCN '99. Conference on Lowell, MA, USA, IEEE Comp. Soc., US, Oct. 18, 1999, 10 pages.

*Primary Examiner* — Bunjob Jaroenchonwanit
(74) *Attorney, Agent, or Firm* — Davidson, Davidson & Kappel, LLC

(57) ABSTRACT

An IP communication architecture between a ground computer connected to a main router and a mobile computer which is located on board a train and which is connected to a mobile router on the train. The architecture includes at least one infrastructure having base stations equipped with radio communication devices and base routers on the ground which are connected to the infrastructure. Each mobile router has a radio communication device suitable for establishing a wireless link with one of the base stations of the infrastructure, a storage device means comprising having the IP address of the base routers connected to the infrastructure, and a connection device for initiating a connection with a base router on the basis of the list of base routers, after a wireless link has been established.

19 Claims, 1 Drawing Sheet

(56) References Cited

U.S. PATENT DOCUMENTS

| | | |
|---|---|---|
| 2003/0112808 A1* | 6/2003 | Solomon .................. 370/400 |
| 2003/0223387 A1* | 12/2003 | Davenport et al. .......... 370/328 |
| 2005/0078632 A1* | 4/2005 | Aramaki et al. ............ 370/331 |
| 2005/0213538 A1* | 9/2005 | Ebiko et al. .................. 370/331 |
| 2006/0159088 A1* | 7/2006 | Aghvami et al. ............ 370/389 |
| 2007/0064661 A1* | 3/2007 | Sood et al. .................... 370/338 |
| 2007/0147320 A1* | 6/2007 | Sattari et al. .................. 370/338 |
| 2008/0181188 A1* | 7/2008 | Aghvami et al. ............ 370/338 |
| 2009/0219900 A1* | 9/2009 | Kokkinen et al. ............ 370/338 |
| 2010/0238811 A1* | 9/2010 | Rune ............................ 370/248 |
| 2011/0051703 A1* | 3/2011 | Fulknier et al. ............... 370/338 |
| 2012/0215931 A1* | 8/2012 | Touati et al. .................. 709/229 |

* cited by examiner

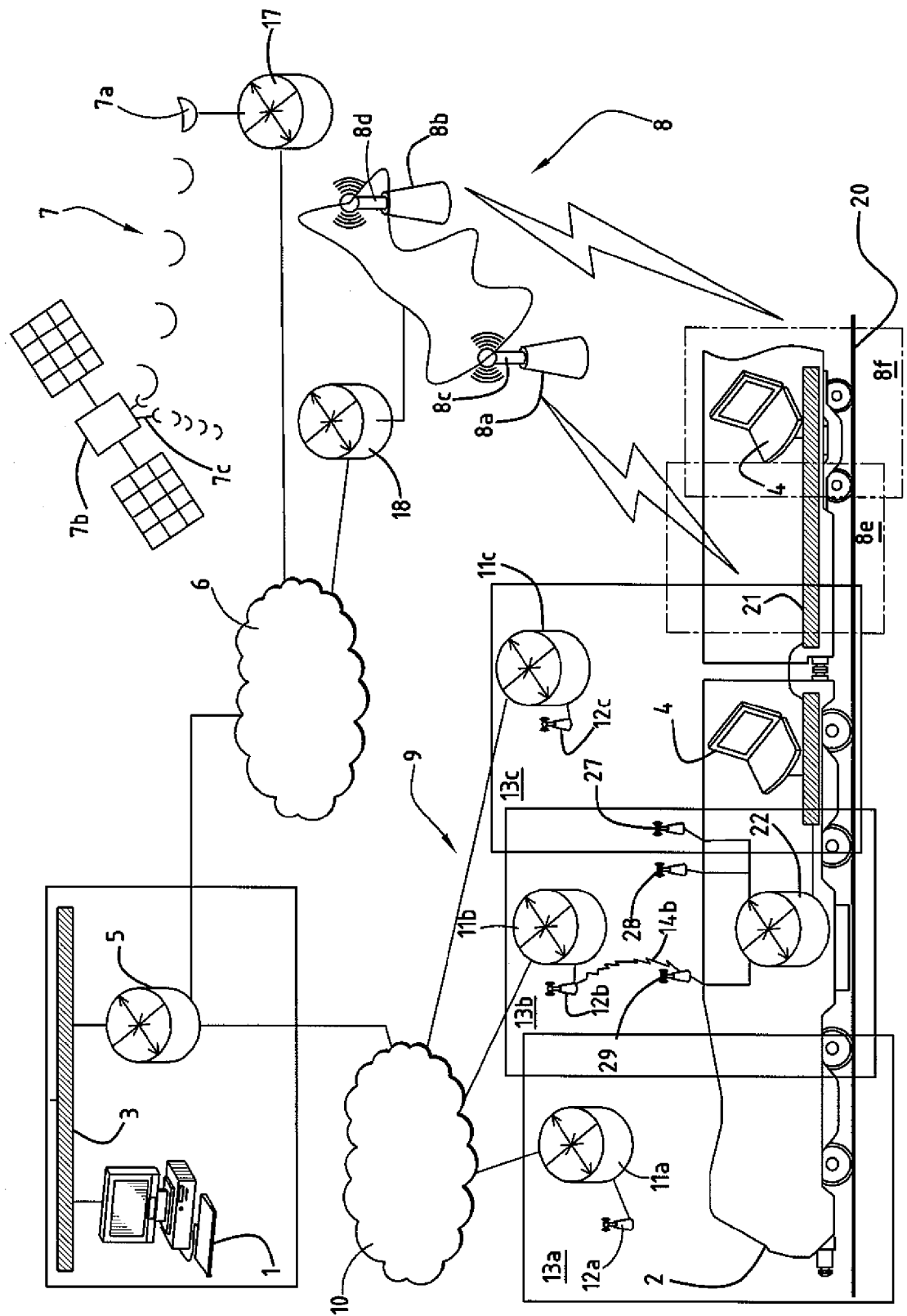

IP COMMUNICATION ARCHITECTURE BETWEEN THE GROUND AND A VEHICLE

The field of the invention is IP communication between a computer on the ground and a computer located on board a terrestrial vehicle such as a train, a tram, an underground train, a car or the like.

BACKGROUND

For data exchange between a fixed computer on the ground and a mobile computer located on board a vehicle, document WO 2005/022839 A1 discloses an architecture using an intermediate communication infrastructure suitable for establishing a wireless link with a mobile gateway which is located on board the vehicle and to which the mobile computer is connected. The communication infrastructure comprises a plurality of base stations. Each base station can establish a wireless link with the mobile gateway using radio communication means when the vehicle is located within the coverage cell of said base station. The different base stations are mutually aggregated and connected to an IP network via an intermediate gateway ("foreign agent"). Once the wireless link is established, the intermediate gateway assigns an IP address on the IP network to the mobile gateway and thereby creates an access point to the IP network. The known architecture also comprises a main gateway which makes it possible to route the IP datagrams to the mobile computer via the appropriate intermediate gateway. In uplink communication, an IP datagram is routed directly to the fixed computer.

In this known architecture, there is only a single intermediate gateway for all the base stations of an individual communication infrastructure. This is the intermediate gateway which configures the logical layer of the communication between the intermediate gateway and the mobile gateway for each new wireless link. The temporal aspect of passing from one cell to another cell of the same infrastructure is not a constraint in this architecture, which has reduced performance levels.

Furthermore, the radio communication means with which a base station is equipped only have a reduced range covering a basic geographical region or cell. Thus, as a juxtaposition of base stations, an infrastructure can only establish a link with a mobile piece of equipment in a highly delimited coverage region corresponding to the different cells.

Moreover, in the coverage region of an infrastructure it is possible for there to be a shadow region where the propagation of the electromagnetic waves is disturbed or blocked by the presence of obstacles between the base station and the vehicle. This is the case for example when a train passes through a tunnel and the link with the base stations of a GSM infrastructure is broken.

To remedy the presence of shadow regions or even the reduced size of the coverage region, a plurality of ground infrastructures are used to cover the entirety of the region within which the vehicle is assumed to have to travel. For example, a mobile piece of equipment which used a first GSM infrastructure in a first country would connect to a second GSM infrastructure available in a second country when crossing the border between these two countries.

SUMMARY OF THE INVENTION

In this document, two communication infrastructures are said to have different technologies if they use different communication protocols for the wireless link (for example WiFi versus WiMAX or WiFi versus GSM).

An object of the invention is therefore to improve the intercellular transfer performance levels within a communication infrastructure whilst also making intercellular transfer possible between cells of different infrastructures to provide continuity of communication between a fixed piece of equipment on the ground and an on-board mobile piece of equipment when switching between two different cells.

The invention relates to an architecture for IP communication between a first, fixed piece of computing equipment which is located on the ground and connected to a first local network and a second, mobile piece of computing equipment which is located on board one vehicle of a plurality of vehicles, each vehicle of the plurality of vehicles comprising a second local network, said second piece of equipment being connected to the second local network of the vehicle on which it is located, This architecture comprises:

a global tree network having:
a main router connected to the first local network;
lower-level nodes formed by a plurality of mobile routers, each vehicle of the plurality of vehicles comprising, connected to the second local network thereof, one of the mobile routers of said plurality of mobile routers; and
intermediate nodes, of which the intermediate nodes which are located just above the lower-level nodes are formed by base routers which are located on the ground; and
at least one communication infrastructure, each base router being connected to a communication infrastructure and having an IP address on the communication infrastructure with which it is associated in this way, the infrastructure comprising base stations equipped with radio communication means,
each mobile router comprising:
a radio communication means suitable for establishing, at a given moment, a wireless link with one of the base stations of the communication infrastructure,
storage means comprising a list of base routers comprising the IP addresses of those base routers with the associated communication infrastructures of which it is able to establish a wireless link, and
connection means for initiating a connection with a base router from the list of base routers, after a wireless link has been established.

According to particular embodiments, the IP communication architecture comprises one or more of the following features, individually or in any technically feasible combinations:

the main routers, base routers and mobile routers respectively comprise a routing table and means for dynamically updating the routing tables, each base router comprising a means for transmitting a connection status message informing the main router about the mobile routers which have just connected to or disconnected from said base router.

the means for connecting a mobile router comprise means for pre-detecting the loss of the active connection and means for temporarily storing data to be transmitted when the quality of the connection is reduced.

a base router comprises storage means comprising a list of new base routers, and a mobile router comprises means for updating its list of base routers on the basis of the list of new base routers in the base router to which it connects.

the base routers are connected to the communication infrastructure with which they are associated in such a way that the distance between a base router and a base station of the associated infrastructure corresponds to a single link in the network.

the communication infrastructure uses a short-range wireless communication technology of the WiFi type, WiMAX type or the like.

the architecture comprises at least first and second communication infrastructures in such a way that a first cell of a first base station of the first infrastructure is superposed, at least in part, in an overlap region, on a second cell of a second base station of the second infrastructure, and the mobile router is suitable for establishing, simultaneously, when the vehicle on which said mobile router is located passes through said overlap region, a first connection with a first base router via a first wireless link established with a base station of the first infrastructure and a second connection with a second base router via a second wireless link established with a base station of the second infrastructure.

the main and mobile routers respectively have arbitration means which allow a route to be selected from a first route passing through said first infrastructure and a second route passing through said second infrastructure for ongoing communication between the first and second pieces of equipment.

the first and second infrastructures are of different types, using different technologies selected from WiFi technology, WiMAX technology, GSM technology, UMTS technology, satellite technology or the like, and each mobile router comprises a plurality of communication means, each communication means being dedicated to establishing a wireless link with an infrastructure of a particular type.

said vehicle being part of a plurality of vehicles and each vehicle comprising a single second local network equipped with a mobile router, an IP address of the second piece of equipment on said global network is private and is obtained by concatenating an identifier common to the plurality of vehicles, an identifier of the vehicle and an identifier of said second piece of equipment on said second local network of the vehicle on which said second piece of equipment is located, and the routing tables of the ground routers, such as the main and base routers, store the identifier of the vehicle on which said second piece of equipment is located, and said ground routers comprise means which make it possible to extract, from the IP address contained in the header of a datagram to be routed, the identifier of the vehicle on which the second piece of equipment, to which said datagram is addressed, is located.

the mobile router and a base router being connected via an underlying infrastructure, and the IP addresses on the global network being private, the mobile and base routers comprise means for encapsulating and "de-encapsulating" the datagrams which they exchange to allow them to be routed over said communication infrastructure.

The invention also provides an asymmetric IP communication method using the architecture described above for communication between a first, fixed piece of computing equipment which is located on the ground and connected to a first local network and a second, mobile piece of computing equipment which is located on board one vehicle of a plurality of vehicles, each vehicle of the plurality of vehicles comprising a second local network equipped with a mobile router, said second piece of equipment being connected to the second local network of the vehicle on which it is located. This method comprises the steps, carried out by the mobile router on board said vehicle, of:

a) establishing a wireless link between a base station of a communication infrastructure, the base station being equipped with a radio communication means, and said mobile router comprising a suitable radio communication means;

b) after said wireless link is established with an infrastructure, testing different IP addresses of base routers connected to said infrastructure, and awaiting a response from one of said base routers; and, c) connecting the mobile router to the base router which has responded.

According to particular embodiments, the method comprises one or more of the following features, individually or in any technically feasible combinations:

after the connection with said base router has been initialised, the method comprises the steps of:

d) storing, in a routing table of the mobile router, the IP address, on said communication infrastructure, of the base router to which it has just connected; and e) storing, in a routing table of the base router, the IP address, on said communication infrastructure, of the mobile router which has just been connected, as well as a reference associated with the IP address, on the global network, of said mobile router;

f) transmitting, from said base router to a main router connected to said first local network, a connection status message containing a reference associated with the IP address on the global network of said mobile router as well as the IP address on the global network of said base router; and g) storing, in a routing table of the main router, the IP address on the global network of the base router which has transmitted said connection status message and the reference associated with the IP address on the global network of said mobile router.

According to particular embodiments, the method comprises one or more of the following features, individually or in any technically flexible combinations:

the base router to which a mobile router has just connected transmits to this mobile router other IP addresses of base routers to update said list of base routers stored in the mobile router.

the mobile router uses a mechanism for pre-detecting the loss of the active connection, and if there is a possibility of said connection being broken, the mobile router stores the datagrams to be transmitted in a data file, executes steps a) to c) again to establish another wireless link and another connection to a base server and, once the new connection has been established, transmits the stored datagrams over said new connection.

while the mobile router is connected to a first base router via a first wireless link with a first base station of a first communication infrastructure, the mobile router establishes, by repeating steps a) to c), a second wireless link with a second base station of a second communication infrastructure and connects to a second base router, and the main and mobile routers arbitrate to select a route from a first route passing through said first infrastructure and a second route passing through said second infrastructure for ongoing communication between the first and second pieces of equipment.

the vehicle being part of a plurality of vehicles and each vehicle comprising a single second local network equipped with a mobile router, the IP address of the second piece of equipment on said global network thus being private and being obtained by concatenating an identifier of said plurality of vehicles, an identifier of said vehicle and an identifier of said second piece of equipment on said second local network of said vehicle, the step of updating the routing table of the main router consists of storing the identifier of said vehicle in the form of a reference associated with the IP address of said mobile router.

for downlink communication from the first piece of equipment to the second piece of equipment, the routing executed by the main router comprises the steps of:

intercepting an IP datagram transmitted over the first local network bound for the second piece of equipment;

extracting the identifier of the vehicle on which the second piece of equipment is located from the IP address of said second piece of equipment given in the header part of the intercepted IP datagram;

reading, from the routing table of the main router, the IP addresses of the base routers which, at the moment in question, are connected to the mobile router of said vehicle;

selecting a base router from said read base routers; and, routing the intercepted IP datagram to the base router selected.

for uplink communication from the second piece of equipment to the first piece of equipment, the routing executed by the mobile router comprises the steps of:

intercepting an IP datagram transmitted by said second piece of equipment over the second local network bound for the first piece of equipment;

reading, from the routing table of the mobile router, the IP address of the base router currently connected to said mobile router; and, routing the intercepted IP datagram to said base router using the wireless link of the infrastructure associated with said base router.

the IP addresses on the global network being private addresses, the step of transmitting an IP datagram between the base router and the mobile router via the communication infrastructure comprises the steps of:

encapsulating an initial IP datagram at a first router, this being either the mobile router or the base router;

transmitting the encapsulated datagram to the other router via said associated communication infrastructure;

"de-encapsulating" the IP datagram received at the other router to extract said initial IP datagram.

BRIEF DESCRIPTION OF THE DRAWINGS

The invention and the advantages thereof will be better understood upon reading the following description, given purely by way of example and by reference to the appended drawing, in which the FIGURE is a schematic representation of the architecture according to the invention.

DETAILED DESCRIPTION OF THE DRAWINGS

The communication architecture is suitable for establishing and maintaining bidirectional communication in IP format between a first, fixed piece of equipment on the ground and a second, mobile piece of equipment located on board any vehicle in a fleet of vehicles.

The first piece of equipment is a computer 1 connected to a first local network 3 which is a private network belonging to the operator of the train 2. The second piece of equipment, on board the train 2, is a supervisory computer 4, connected to various sensors and various actuators. The computer 4 is connected to a second local network 21 on board the train 2.

Global Network

The computers 1 and 4 communicate via an architecture which forms, at a higher level, a global tree network of which the root node is a main router 5, connected to the first network 3, and the lower-level nodes are mobile routers located on board trains. Each train in the fleet comprises a mobile router connected to the second network of the relevant train. Between the root node and the lower-level node, the global network comprises different intermediate nodes. In particular, the intermediate nodes which are located just above the lower-level nodes will be referred to as base routers hereinafter. The base routers 11*a-c*, 17 and 18 are fixed on the ground.

The connection between a base router on the ground and an on-board mobile router is established via a wireless link in a manner which will be described hereinafter. Over time, as the train travels, the mobile router is capable of disconnecting from a first base router and connecting to a second base router. Thus, the topology of the global network evolves over time as a function of the effective connections, at a given moment, between the lower-level nodes and the nodes of the level just above.

A router takes part in the routing of an IP datagram along a particular routing path of the global network. It comprises storage means of the RAM type in which a routing table and a data file allowing temporary storage of IP datagrams are stored. A router comprises means for updating the routing table thereof. The structure of the routing tables of each type will be described in detail below.

Underlying Network and Infrastructure

At a lower level in the architecture, any two nodes of the global network can communicate directly or indirectly via an underlying network. For example, in the FIGURE, communication between the main router 5 and the base routers 17 and 18 takes place via an underlying network 6.

The communication between a base router and a mobile router uses a wireless link which is established between the mobile router 22 and a base station of a communication infrastructure to which at least one base router is connected. A base router associated with an infrastructure has a fixed public IP address on this associated infrastructure.

Each infrastructure comprises one or more base stations equipped with radio communication means and capable of establishing a wireless link in a cell. When a wireless link is established, the mobile router receives a public IP address on the relevant infrastructure.

The FIGURE shows infrastructures of different technologies: a first infrastructure 7 making it possible to establish long-range wireless links, a second infrastructure 8 making it possible to establish medium-range wireless links, and a third infrastructure 9 making it possible to establish short-range wireless links.

The first infrastructure 7 is of the satellite type. A relay station 7*a* communicates with a satellite 7*b* acting as a "base station". The communication means 7*c* of the satellite 7*b* cover a wide "cell".

In the second infrastructure 8, for example of the UMTS or GSM type, the base stations 8*a*, 8*b*, equipped respectively with antennae 8*c*, 8*d*, cover associated cells 8*e*, 8*f* having a radius varying from approximately a hundred meters to several kilometers.

The third infrastructure 9 comprises an aggregation network 10 and base stations 12*a*, 12*b* and 12*c*. Each base station 12*a*, 12*b* or 12*c* is equipped with radio communication means, operating in transmission and reception models and capable of establishing a wireless link in the WiFi format. In a variant, equivalent types of short-range link, such as a WiMAX link, are conceivable. Each base station 12*a*, 12*b*, 12*c* covers a cell 13*a*, 13*b*, 13*c*. A WiFi link has a maximum range of 300 m, reduced to less than 100 m if there is an obstacle in the path of the radio waves. The union of the cells 13*a*, 13*b*, 13*c* forms a continuous geographical coverage region along the track 20.

The mobile router 22 is equipped with communication means 27, 28 and 29. Each communication means 27, 28, 29 is specific to the establishment of a wireless link with the base stations of a given infrastructure from the infrastructures 7, 8 and 9. Thus, the means 27 make it possible to establish a satellite-type link with the satellite 7*a* of the infrastructure 7, the means 28 make it possible to establish a link of the GSM type with one of the base stations 8a, 8b of the infrastructure 8, and the means 29 make it possible to establish a link of the WiFi type with one of the base stations 12a, 12b, 12c of the infrastructure 9. These means are mutually independent in such a way as to make it possible for wireless links with different infrastructures or infrastructures of different technologies to exist simultaneously.

The FIGURE shows two variant embodiments. Specifically, a communication infrastructure may be either a proprietary infrastructure managed by the operator of the fleet of trains or an infrastructure managed by a third party. For example, an infrastructure of the WiFi type is typically of the proprietary type, since it is relatively cheap to set up and operate. By contrast, a GSM or satellite infrastructure is an infrastructure operated by third parties.

In the case of an infrastructure belonging to a third party, the management of the wireless link is not accessible to the operator. Thus, the architecture according to the invention provides that a base router is arranged upstream from the relevant infrastructure. For example, in the FIGURE a base router 18 is connected between, on the one hand, the main router 5 and the intermediate network 6 and, on the other hand, the infrastructure 8. Likewise, a base router 17 is connected between, on the one hand, the main router 5 and the intermediate network 6 and, on the other hand, the infrastructure 7.

By contrast, in the case of a proprietary infrastructure, the proprietor may advantageously place a plurality of base routers within the infrastructure, as close as possible to the base stations. For example, in the infrastructure 9, base routers 11a, 11b and 11c are arranged between an associated base station 12a, 12b and 12c respectively and the aggregation network 10. In a variant, a plurality of base stations are associated with the same base router. Within the infrastructure 9, the base stations 12a, 12b, 12c are thus directly connected to a base router 11a, 11b, 11c in such a way that there is a single link separating the base routers from the base stations in the infrastructure 9.

Communication between the main router 5 and the different base routers 11a-c takes place via the underlying network formed by the aggregation network 10 of the infrastructure 9.

The infrastructure 9 may be a private or public proprietary infrastructure. The operating principle remains the same. The difference lies in the addressing of the base routers: in a private infrastructure, the base routers are connected to a private network; in a public infrastructure, they are connected to a private intranet belonging to the proprietor, which is accessible via the Internet, which is public, by means of an encapsulation mechanism (VPN, or "virtual private network"). This is still a base router IP address accessible to the mobile router 22.

Format of the Private IP Addresses

On the global network, the architecture uses private IP addresses, the format of which will now be described, for the IP addresses of the second pieces of equipment on board. Each second piece of equipment is identified by a 32-bit coded IP address which is specific thereto. It will be noted that according to the IPv4 standard currently in effect, IP addresses are coded in 32 bits. They will be coded in 64 bits in the future version IPv6.

The operator of a railway line must track, in real time, a plurality of trains which together form a fleet of trains. This fleet is distinguished by a unique "fleet ID", coded in X bits.

A particular train in this fleet is labelled within the fleet by a unique "vehicle ID" identifier, coded in Y bits. Thus, the train 2 is identified by the identifier ID2. According to the invention, each train comprises only a single second network, equipped with a single mobile router. Thus, the train 2 comprises a single second local network 21 connected to a single mobile router 22. Thus, the identifier "vehicle ID" of a vehicle also distinguishes the mobile router on board this vehicle.

A second on-board piece of computing equipment is referenced by a unique "equipment ID" identifier, coded in [32-X-Y] bits. The computer 4 is identified by the number ID4 on the second local network 21 of the train 2 to which it is connected.

According to the invention, the IP address of a second on-board piece of equipment is defined uniquely by concatenating the fleet, vehicle and equipment identifiers according to the formula: IP equipment=<fleet ID><vehicle ID><equipment ID>.

Thus, the computer 4 has the IP address: IP4=<fleet ID>.ID2.ID4.

By convention, the IP address of the mobile router 22 of the local network 21 is <fleet ID>.ID2.<0 . . . 1>. The subnet mask of the local network 21 is <fleet ID>.ID2.<0 . . . 0>.

It is thus found that the second networks, located on board the vehicles of the fleet, together form a single, unique segment of the global network, and that a particular second network forms a sub-segment of this segment. The "fleet" segment is thus formed of scattered "train" sub-segments.

This flat addressing method, implemented on the global network, has a number of advantages. First, there is no addressing conflict within the global network, no matter which trains are currently running at a given moment. Moreover, when two trains are coupled, there is no need to install a gateway computer between each of the two second local networks, and the equipment on board the second train is "visible" without the global network having to be reconfigured.

Moreover, by executing a decoding algorithm for the private IP addresses written in this format, each router can advantageously keep up to date only one simplified routing table comprising the vehicle identifier "vehicle ID", as will be described hereinafter.

Routing

Using an IP addressing method of this type, the communication architecture can reuse the existing routing structures of the underlying networks. However, the initial datagrams, the header of which comprises the private IP address of a target computer, cannot be routed by the routers of an underlying network which does not recognise these private IP addresses. In this case, communication between two nodes of the global network takes place by encapsulating an initial datagram in an intermediate datagram suitable for being routed by the underlying network connecting the two relevant nodes. The initial datagram thus appears as the payload of the intermediate datagram. The header of the intermediate datagram comprises the IP address of the target global network node, the public IP address on the underlying network. In fact, a tunneling mechanism is implemented.

For routing on the global network, the different routers each have a routing table, mapping the private IP address of the target of an initial datagram to the IP address of the following router on the routing path via which said initial datagram is to be transmitted. Since the global network changes over time, these tables must be kept up to date dynamically each time a mobile router connects or disconnects. It will be noted that the following description of the routing tables is based on the simple case of the three-level global network shown in FIG. 1.

More precisely, taking into account the format of the IP addresses of the on-board computers, a "consolidated" routing table, stored and kept up to date by the main router 5, maps the "vehicle ID" identifier of a train to the IP address of the base router to which the mobile router of this train is currently connected, for each infrastructure 7, 8 or 9. For example, in the "consolidated" routing table, the identifier ID2 of the train 2 is mapped, for the WiFi infrastructure 9, to the public address IP11b on the network 10 of the base router 11b to which the mobile router 22 of the train 2 is currently connected via the link 14b.

A "base" routing table, stored and kept up to date by each base router, comprises the list of "vehicle ID" identifiers of the vehicles connected, at the relevant moment, to this base router, as well as the IP address of the mobile router on the associated infrastructure. For example, the "base" routing table of the base router 11b comprises the identifier ID2 of the train 2 currently connected via the link 14b and the IP address 22 of the mobile router 22 on the infrastructure 9. Moreover, the base router knows the fixed IP address of the node located immediately above it in the global network, in the present case the main router 5 in the three-level architecture shown in the FIGURE.

Finally, the "mobile" routing table, stored and kept up to date by the mobile router, comprises, for each infrastructure to which it is currently linked, the public IP address of a base router of this infrastructure to which it is connected. For example, the "mobile" routing table of the mobile router 22 comprises, for the infrastructure 9, the address IP11b of the base router 11b to which it is currently connected using the link 14b.

The operation of the communication architecture will now be described in detail. After describing the operation while the train remains within the coverage region of a single infrastructure, for example the infrastructure 9, the operation making it possible to provide continuity of communication when switching between two different infrastructures will be described.

Establishing a Link and Connecting to the Router

As the train 2 travels along the track 20, the communication means 29 controlled by the mobile router 22 transmit at regular intervals radio connection signals, or beacons, for discovering any base stations of the infrastructure 9 to establish a wireless link. Generally, either the physical layer of the link already exists and the mobile router 22 configures the logical layer of the link, as is for example the case in a link of the WiFi type, or the physical layer does not yet exist, and during the phase of establishing the link, the mobile router 22 must first initialise the physical layer, then configure the logical layer, as is for example the case in a link of the GPRS type.

When the train 2 enters the cell 13b associated with the base station 12b, said station detects the emitted beacons. A configuration process for the logical layer of the wireless link 14b of the WiFi type is then executed between the base station 12b, which acts as a "master" computer, and the mobile router 22, which acts as a "slave" computer. The mobile router 22 receives a public IP address on the infrastructure 9.

Once the wireless link 14b is established between the base station 12b and the mobile router 22, said router connects to a base router associated with the infrastructure 9.

The mobile router 22 comprises, stored in the storage means thereof, a list of base routers comprising the IP addresses of the base routers to which it is capable of connecting as the train 2 travels along the track 20. Thus, the mobile router 22 attempts to connect to a base router by testing the different IP addresses indicated by this list of base routers.

In the case of a non-proprietary infrastructure 8 or 7, the mobile router knows the IP address of the base router 18 or 17 associated with this infrastructure. The connection between the mobile router 22 and the corresponding base router is thus established in a simple manner. In a variant, the base routers could be omitted in a non-proprietary infrastructure, and a mobile router using an infrastructure of this type would connect directly to the main router.

The connection is established when the base router responds. In more detail, the connection established between the mobile router 22 and the base router 11b is formed from two pairs of logical channels: one pair of channels formed from a communication channel and a control channel for uplink communication; and one pair of channels formed from a communication channel and a control channel for downlink communication. The control channels transmit, inter alia, periodic messages for maintaining the connection ("keep-alive" messages).

Once a connection to a base router is established, for example the base router 11b, the public IP address thereof is stored in the mobile routing table, as well as an identifier for the infrastructure 9, i.e. for the communication means used to establish the wireless link 14b.

After the connection is established, the mobile router 22 appears, on the global network of the communication architecture, as a lower-level node connected to the base router 11b.

It will be noted that initially, the list of routers stored by the mobile router 22 comprises the IP addresses of the base routers located at the departure and arrival ends of the track 20. After connecting to a base router, the mobile router 22 receives therefrom a series of new IP addresses of neighbouring routers to update the list of base routers stored by the mobile router. This updated list will be used to establish another connection to another base router in anticipation of the present connection being broken off.

When a connection is established, the base router 11b dynamically updates the "base" routing table thereof by storing the public IP address of the mobile router 22, associating it with the identifier ID2 of the train 2 on board which said mobile router 22 is located, by breaking down the private IP address of the mobile router.

At the moment of connection to the mobile router 22, the base router 11b transmits a connection status message to the main router 5. This message indicates the IP of the transmitting base router, the identifier of the newly connected train ID2, and an identifier of the underlying infrastructure of this connection. When this message is received, the main router 5 executes an algorithm for updating the "consolidated" routing table thereof, consisting of storing the address IP 11b of the base router 11b, in a new range corresponding to the identifier ID2 of the train 2 and for the column corresponding to the infrastructure 9.

Once the interruption of the exchange of periodic messages indicates to the mobile and base routers that disconnection has occurred, the different routing tables are updated as a result.

Communication

In downlink communication, i.e. from the computer 1 to the computer 4, the computer 1 on the ground transmits to the on-board computer 4 an initial datagram of which the header comprises the private address IP4 of the target computer 4.

This initial datagram is intercepted by the main router 5, which reads the header to search for the address IP4 of the computer 4. The IP address decoding algorithm extracts from the address IP4 the identifier ID2 of the train 2 on board which the computer 4 is located. Upon a request from the "consolidated" routing table, the main router 5 extracts the public address IP 11b of the base router 11b associated with the identifier ID2 and encapsulates the initial datagram in a first intermediate datagram, the header of which comprises in particular the address IP11*b* of the base router 11*b* on the network 10. The first intermediate datagram is subsequently routed, on the network 10, to the base router 11*b*.

The first intermediate datagram is read by the base router 11*b*, which "de-encapsulates" it and reads the address IP4 contained in the initial datagram. The base router 11*b* extracts from the address IP4 the identifier ID2 of the train 2. Upon a request from the "base" routing table, the base router 11*b* checks in a simple manner that the corresponding mobile router 22 is still connected. The base router 11*b* then encapsulates the initial datagram in a second intermediate datagram, the header of which comprises the public IP address of the mobile router 22 and transmits it to the mobile router 22 along the downlink data channel of the connection using inter alia the wireless link 14*b*.

The mobile router 22 "de-encapsulates" the second intermediate datagram and identifies the target computer 4 on the basis of the address IP4 present in the header of the initial datagram. Said initial datagram is filially transmitted on the local network 21 so as to be received by the computer 4.

In uplink communication, i.e. from the computer 4 to the computer 1, the mechanism is simpler. In effect, the system architecture forms a tree network. Whereas in downlink communication the routes have to be specified, in uplink communication there is only a single route since all of the uplink traffic converges towards the main router 5 before being retransmitted on the first network 3. Therefore, the "consolidated" routing table is not used in uplink communication. Only the IP address of the node of the tree system immediately above need be known to the node which is routing a datagram. The communication is asymmetric in this respect. If the communication between two nodes of the global network passes through an underlying network, an encapsulation mechanism is implemented.

Horizontal Roaming

Once established, the link 14*b* only lasts for the time in which the train 2 is travelling through the cell 13*b*. The communication means of the mobile router 22 comprise means for pre-detecting the loss of link, which detect the possibility of the first connection being broken by monitoring one of the two control channels of the active connection.

When the possibility of the active connection being broken is detected, the data to be transmitted in uplink communication are stored in a data file of the mobile router. Since the link 14*b* is only temporary, the communication means 29 of the mobile router 22 continue to transmit beacons to initiate another link with one of the base stations 12*a*, 12*b*, 12*c* of the cells 13*a*, 13*c* contiguous with the cell 13*b* to allow the communication between the equipment on the ground and the equipment on board to continue. After this other wireless link is established, the status of the first wireless link is checked so as to determine whether the link has been broken. If no, the data stored in the file are transmitted using the first connection. If yes, the process continues by establishing a new connection with a base router as described above. In particular, establishing a second connection leads to the routing tables being updated. A pointer on the uplink transmission data file is repositioned to the last correctly transmitted datagram, and the corresponding data of the data file are then transmitted using the second connection. The uplink communication between the on-board equipment and the equipment on the ground can then continue. It is possible that some datagrams treated as lost may in fact have been transmitted correctly. There will thus be duplicates at the main router 5, which will filter these out before transmitting them on the first local network 3.

When the first connection is broken and the second connection is established, the main router 5 is notified of this. On the line of the identifier ID2 of the train 2, the "consolidated" routing table has been updated in such a way as no longer to comprise the IP address of the first base router in the column of the infrastructure 9, but instead to comprise the IP address of the second base router.

At a given moment, the main router 5 routes the intercepted IP datagrams on the first local network 3 to one of the base routers connected to the mobile router 22, on the basis of the data present in the "consolidated" routing table. Since this involves routing in the computer 5, the switchover is fast enough for this operation to be completely transparent.

As regards the time interval before the first connection is broken and the second connection is established, the IP communication format comprises procedures for checking for transmission errors and retransmitting a request from a computer if the target computer has not responded. These procedures are implemented by the main router 5 in downlink communication. The main router 5 comprises a buffer which systematically stores the last datagrams routed in downlink communication to eliminate any irregularities and prevent data loss.

Thus, the packets which were transmitted to the first base router just before the first connection was broken, and for which it is therefore not known whether they reached the mobile router 22, are retransmitted to the second base router to continue the current downlink communication without interruption.

The current communication can thus switch rapidly, in approximately 50 ms, from the first connection to the second connection.

Vertical Roaming

The respective coverages of each infrastructure are such that they form continuous coverage, the shadow regions of one infrastructure being covered by the coverage region of one or more of the other infrastructures. Thus, at a given moment, the mobile router 22 is linked to at least one infrastructure 7, 8 or 9. Thus, in a "consolidated" routing table, one table cell in the row corresponding to the identifier ID2 of the train 2 comprises an IP address.

Where the coverage regions of a plurality of base stations of different infrastructures overlap, the mobile router 22 may establish a plurality of links simultaneously. This is made possible in that the mobile router 22 comprises a plurality of communication means 27-29 which are respectively dedicated to establishing a wireless link having a particular technology and/or a link with a particular infrastructure.

Thus, whilst the mobile router 22 has already established a first link with a first infrastructure on which the communication between the computers 1 and 4 is transmitted, when the train 2 travels in an overlap region which corresponds to the superposition, at least in part, of cells of two base stations belonging to different infrastructures, the mobile router establishes a second link with the second infrastructure while the train 2 is crossing the overlap region between these two infrastructures. Once each of these links is established, and thus the corresponding connections to the base routers are established, the main router 5 is notified as a result. The "consolidated" routing table is thus updated in such a way as to comprise, while the train 2 is located in this overlap region, on the line of the identifier ID2 of the train, the IP address of the first base router associated with the first infrastructure, in the column for the first infrastructure, and the IP address of the second base router associated with the second infrastructure, in the column for the second infrastructure.

When a plurality of network infrastructures 7, 8 or 9 simultaneously offer the possibility of communicating with the train 2, the main router 5 and the mobile router 22 arbitrate by selecting the most suitable infrastructure 7, 8 or 9. This selection is carried out according to a plurality of rules which can be configured by the operator. For example, a "proprietary" priority rule makes it possible to select a proprietary WiFi infrastructure over another WiFi infrastructure belonging to a third party; a "bandwidth" priority rule makes it possible to select from the available infrastructures the one providing high-speed communication; a "cost" priority rule makes it possible to select the infrastructure for which the price of the communications is lowest; etc.

The mobile router and the main router implement a mechanism for placing in buffer memory any data which are to be routed upon switching the current communication from the first infrastructure to the second infrastructure, in a manner similar to that described in detail for horizontal roaming.

Security

In the lower part of the architecture, the wireless link between the base station and the mobile router is considered to be unreliable. As stated above, there are two control communication channels which respectively transmit authentication and session key exchange information, as well as periodic messages for maintaining the wireless link ("keep-alive" messages). The periodic messages also transport status information for a data file, which makes any retransmission of data possible if the connection is temporarily broken for a short duration of less than 4 seconds. After this duration, the data file is emptied and the routing tables are updated, indicating that the connection is no longer active. It is possible to configure the architecture in such a way as not to retransmit particular types of data. In the case for example of a streaming video, it is not desirable to retransmit the lost datagrams.

Furthermore, it is necessary to secure communication between the mobile router 22 and the corresponding base router 11a-c, 17 or 18. This is made all the more necessary when sensitive data relating to information for operating the train 2 are transmitted. In particular, underlying WiFi and WiMAX links are considered non-secure because the security layers of these protocols have to be deactivated if high-performance horizontal roaming is to be provided, since the authentication algorithms currently in use, such as WEP, AES and Radius, are slow and do not allow switching within approximately 50 ms at a transition between cells.

According to the invention, the connection between the base router and the mobile router is secured in a first authentication step followed by a second encryption step:

The purpose of the authentication step is the mutual identification of the nodes, the base router 11a-c, 17 or 18 and mobile router 22, which communicate via the non-secure radio link 14b. The authentication step according to the invention uses the methodology of asymmetric cryptography, which is known to the person skilled in the art, based on the existence of private and public keys coded at a length of 512 bits. The private key is kept secret in the mobile router 22 which generated it. Authentication is a time-consuming process. To minimise this time during the transition between cells, the architecture according to the invention uses a pre-authentication mechanism, initiated at the start of the session, with a "system" encryption key. This system key is not a session key since it is coded into the system.

The data traffic is always encrypted between the train and the infrastructure on the ground. There are two methods of encryption which can be implemented in the encryption step. They are based on the session key and the system key respectively. Once the authentication step for the train 2 is complete, the session key is created and the system key is replaced with the session key. The encryption keys have lengths varying from 64 bits to 512 bits in increments of 64 bits.

Each vehicle in the fleet defines a mobile sub-segment of the network. These disjoint mobile segments form a scattered segment. With the architecture described above, the operator can track a plurality of trains simultaneously. In particular, the main router 5 provides IP routing between the first fixed local network and the routers of the mobile sub-segments irrespective of the underlying intermediate infrastructure.

What is claimed is:

1. A system for IP communication between a first fixed piece of computing equipment located on the ground and connected to a first local network and a second mobile piece of computing equipment located on board one vehicle of a plurality of vehicles, each vehicle of the plurality of vehicles having a second local network, the second piece of equipment being connected to the second local network of the one vehicle on which the second piece of computing equipment is located, the system comprising:

a global tree network including:
  a main router connected to the first local network;
  lower-level nodes formed by a plurality of mobile routers, each vehicle of the plurality of vehicles having one mobile router of the plurality of mobile routers, the one mobile router being connected to the second local network of the one vehicle; and
  intermediate nodes, the intermediate nodes being located above the lower-level nodes, the intermediate nodes including base routers, the base routers being located on the ground;
at least one communication infrastructure, each base router being connected to one of the at least one communication infrastructures and having an IP address on the one of the at least one communication infrastructures with which it is associated, each of the at least one communication infrastructures including base stations equipped with base station radio communication devices,
wherein each mobile router includes:
a mobile router radio communication device for establishing, at a given moment, a wireless link with one of the base stations of the at least one communication infrastructures,
a mobile router storage device having a list of each base router which includes the IP addresses of each base router with the associated communication infrastructures of which the mobile router radio communication device is able to establish the wireless link, and
a mobile router connection device for initiating a connection with one of the base routers from the list of each base router, after the wireless link has been established,
wherein the main routers, the base routers and the mobile routers respectively include a main routing table, a base routing table and a mobile routing table and a main updating device, a base updating device and a mobile updating device for dynamically updating the main, base and mobile routing tables, each base router having a base transmitting device for transmitting a connection status message to the main router, informing the main router about the mobile routers which have just connected to or disconnected from the relevant base router, and
wherein the base routers include a base router storage device comprising a list of new base routers, wherein the mobile router updating device updates the list of base routers based on the list of new base routers in the base router to which the mobile router connects.

2. The system according to claim 1 wherein the mobile router connection device for connecting one mobile router of the plurality of mobile routers includes a pre-detecting device for pre-detecting the loss of an active connection and a mobile temporary storage device for temporarily storing data to be transmitted when the quality of the active connection is reduced.

3. The system according to claim 1 wherein the base routers are connected to the associated communication infrastructure in such a way that a distance between a base router and a base station of the associated infrastructure corresponds to a single link in the network.

4. The system according to claim 1 wherein the at least one communication infrastructure uses a short-range wireless communication technology.

5. The system according to claim 4 wherein the short-range wireless communication technology is of a WiFi type or a WiMAX.

6. The system according to claim 1 wherein the system includes a first and a second communication infrastructure of the at least one communication infrastructures in such a way that a first cell of a first base station of the first infrastructure is superposed, at least in part, in an overlap region, on a second cell of a second base station of the second infrastructure, and in that the one mobile router of the plurality of mobile routers simultaneously establishes when the one vehicle on which the mobile router is located passes through the overlap region, a first connection with a first base router via a first wireless link established with a first base station of the first infrastructure and a second connection with a second base router via a second wireless link established with a second base station of the second infrastructure.

7. The system according to claim 6 wherein the main router and the one mobile router of the plurality of mobile routers respectively have a main arbitration device and a mobile arbitration device allowing a route to be selected from a first route passing through the first infrastructure and a second route passing through the second infrastructure for ongoing communication between the first piece of computing equipment and the second piece of computing equipment.

8. The system according to claim 7 wherein the first and second infrastructures are of different types, using different technologies and the one mobile routers of the first and second infrastructures include a plurality of the mobile router radio communication devices, each mobile router radio communication device establishing the wireless link with the first and second infrastructure of a same technology.

9. The system according to claim 8 where in the different technologies are a WiFi technology, a WiMAX technology, a GSM technology, a UMTS technology or a satellite technology.

10. The system according to claim 1 wherein the plurality of mobile routers and the base routers are connected via the at least one communication infrastructure and the IP addresses on the global network are private IP addresses, the mobile and base routers including a mobile and base encapsulating device respectively for encapsulating and "de-encapsulating" the datagrams which the mobile routers and the base routers exchange to allow the datagrams to be routed over the at least one communication infrastructure.

11. The system according to claim 1 wherein the IP address of each base router is a fixed IP address.

12. An asymmetric IP communication method using a system for IP communication between a first fixed piece of computing equipment located on the ground and connected to a first local network and a second mobile piece of computing equipment located on board one vehicle of a plurality of vehicles, each vehicle of the plurality of vehicles having a second local network, the second piece of equipment being connected to the second local network of the one vehicle on which the second piece of computing equipment is located, the system comprising:
  a global tree network including:
    a main router connected to the first local network;
    lower-level nodes formed by a plurality of mobile routers, each vehicle of the plurality of vehicles having one mobile router of the plurality of mobile routers, the one mobile router being connected to the second local network of the one vehicle; and
    intermediate nodes, the intermediate nodes being located above the lower-level nodes, the intermediate nodes including base routers, the base routers being located on the ground;
  at least one communication infrastructure, each base router being connected to one of the at least one communication infrastructures and having an IP address on the one of the at least one communication infrastructures with which it is associated, each of the at least one communication infrastructures including base stations equipped with base station radio communication devices,
  wherein each mobile router includes:
  a mobile router radio communication device for establishing, at a given moment, a wireless link with one of the base stations of the at least one communication infrastructures,
  a mobile router storage device having a list of each base router which includes the IP addresses of each base router with the associated communication infrastructures of which the mobile router radio communication device is able to establish the wireless link, and
  a mobile router connection device for initiating a connection with one of the base routers from the list of each base router, after the wireless link has been established, for communication between a first, fixed piece of computing equipment located on the ground and connected to a first local network and a second, mobile piece of computing equipment located on board one vehicle of a plurality of vehicles, each vehicle of the plurality of vehicles comprising a second local network equipped with a mobile router, the second piece of equipment being connected to the second local network of the one vehicle on which it is located,
the method comprising the following steps, carried out by the mobile router on board the one vehicle:
  a) establishing a wireless link between a base station of a communication infrastructure, the base station being equipped with a base radio communication device, and the mobile router including a mobile router radio communication device;
  b) after the wireless link is established with the communication infrastructure, testing different IP addresses of base routers connected to the communication infrastructure, and awaiting a response from one of the base routers; and,
  c) connecting the mobile router to the responding base router, and
after the connection with the responding base router has been initialized, the following steps of:

d) storing, in a routing table of the mobile router, the IP address, on the communication infrastructure, of the responding base router to which the mobile router has just connected; and e) storing, in a routing table of the responding base router, the IP address, on the communication infrastructure, of the mobile router which has just been connected, as well as a reference associated with the IP address, on the global network, of the mobile router;

f) transmitting, from the responding base router to a main router connected to the first local network, a connection status message containing the reference associated with the IP address on the global network of the mobile router as well as the IP address on the global network of the responding base router; and g) storing, in a routing table of the main router, the IP address on the global network of the responding base router which has transmitted the connection status message and the reference associated with the IP address on the global network of the mobile router.

13. The method according to claim 12 wherein the responding base router, to which the mobile router has just connected, transmits to the mobile router other IP addresses of base routers to update a list of base routers stored in the mobile router.

14. The method according to claim 12 wherein the mobile router uses a mechanism for pre-detecting the loss of an active connection, and when there is a possibility of the active connection being broken, the mobile router stores datagrams to be transmitted in a data file, executes steps a) to c) again to establish another wireless link and a new connection to a base server and, once the new connection has been established, transmits the stored datagrams over the new connection.

15. The method according to claim 12 wherein for uplink communication from the second piece of equipment to the first piece of equipment, the routing executed by the mobile router comprising the following steps:

intercepting an IP datagram transmitted by the second piece of equipment over the second local network bound for the first piece of equipment;

reading, from the routing table of the mobile router, the IP address of the base router currently connected to the mobile router; and routing the intercepted IP datagram to base router using the wireless link of the associated communication infrastructure with base router.

16. The method according to claim 12 wherein the IP addresses on the global network are private addresses, the step of transmitting an IP datagram between the base router and the mobile router via the communication infrastructure comprising the following steps:

encapsulating an initial IP datagram at a first router, the first router being either the mobile router or the base router;

transmitting the encapsulated IP datagram to the other router via the associated communication infrastructure;

"de-encapsulating" the IP datagram received at the other router to extract the initial IP datagram.

17. An asymmetric IP communication method using a system for IP communication between a first fixed piece of computing equipment located on the ground and connected to a first local network and a second mobile piece of computing equipment located on board one vehicle of a plurality of vehicles, each vehicle of the plurality of vehicles having a second local network, the second piece of equipment being connected to the second local network of the one vehicle on which the second piece of computing equipment is located, the system comprising:

a global tree network including:
  a main router connected to the first local network;
  lower-level nodes formed by a plurality of mobile routers, each vehicle of the plurality of vehicles having one mobile router of the plurality of mobile routers, the one mobile router being connected to the second local network of the one vehicle; and
  intermediate nodes, the intermediate nodes being located above the lower-level nodes, the intermediate nodes including base routers, the base routers being located on the ground;

at least one communication infrastructure, each base router being connected to one of the at least one communication infrastructures and having an IP address on the one of the at least one communication infrastructures with which it is associated, each of the at least one communication infrastructures including base stations equipped with base station radio communication devices, wherein each mobile router includes:
  a mobile router radio communication device for establishing, at a given moment, a wireless link with one of the base stations of the at least one communication infrastructures,
  a mobile router storage device having a list of each base router which includes the IP addresses of each base router with the associated communication infrastructures of which the mobile router radio communication device is able to establish the wireless link, and
  a mobile router connection device for initiating a connection with one of the base routers from the list of each base router, after the wireless link has been established, for communication between a first, fixed piece of computing equipment located on the ground and connected to a first local network and a second, mobile piece of computing equipment located on board one vehicle of a plurality of vehicles, each vehicle of the plurality of vehicles comprising a second local network equipped with a mobile router, the second piece of equipment being connected to the second local network of the one vehicle on which it is located, the method comprising the following steps, carried out by the mobile router on board the one vehicle:

a) establishing a wireless link between a base station of a communication infrastructure, the base station being equipped with a base radio communication device, and the mobile router including a mobile router radio communication device;

b) after the wireless link is established with the communication infrastructure, testing different IP addresses of base routers connected to the communication infrastructure, and awaiting a response from one of the base routers; and, c) connecting the mobile router to the responding base router, wherein while the mobile router is connected to a first base router via a first wireless link with a first base station of a first communication infrastructure, the mobile router establishes, by repeating steps a) to c), a second wireless link with a second base station of a second communication infrastructure and connects to a second base router, and in that the main and mobile routers arbitrate to select a route from a first route passing through the first infrastructure and a second route passing through the second infrastructure for ongoing communication between the first and second pieces of equipment, wherein the one vehicle being part of a plurality of vehicles and each vehicle include a single second local network equipped with a mobile router, the IP address of the second piece of equipment on the global network being private and obtained by concatenating an identifier of the plurality of vehicles, an identifier of the one vehicle and an identifier of the second piece of equipment on the second local network of the one vehicle, the step of updating the routing table of the main router consisting of storing the identifier of the one vehicle in the form of a reference associated with the IP address of the mobile router.

18. The method according to claim 17 wherein for downlink communication from the first piece of equipment to the second piece of equipment, the routing executed by the main router, comprising the following steps:
   intercepting an IP datagram transmitted over the first local network bound for the second piece of equipment;
   extracting the identifier of the one vehicle on which the second piece of equipment is located from the IP address of the second piece of equipment given in a header part of the intercepted IP datagram;
   reading, from the routing table of the main router, the IP addresses of the base routers which, at the moment in question, are connected to the mobile router of the one vehicle;
   selecting a base router from the connected base routers; and,
   routing the intercepted IP datagram to the base router selected.

19. A system for IP communication between a first fixed piece of computing equipment located on the ground and connected to a first local network and a second mobile piece of computing equipment located on board one vehicle of a plurality of vehicles, each vehicle of the plurality of vehicles having a second local network, the second piece of equipment being connected to the second local network of the one vehicle on which the second piece of computing equipment is located, the system comprising:
   a global tree network including:
      a main router connected to the first local network;
      lower-level nodes formed by a plurality of mobile routers, each vehicle of the plurality of vehicles having one mobile router of the plurality of mobile routers, the one mobile router being connected to the second local network of the one vehicle; and
      intermediate nodes, the intermediate nodes being located above the lower-level nodes, the intermediate nodes including base routers, the base routers being located on the ground;
   at least one communication infrastructure, each base router being connected to one of the at least one communication infrastructures and having an IP address on the one of the at least one communication infrastructures with which it is associated, each of the at least one communication infrastructures including base stations equipped with base station radio communication devices,
wherein each mobile router includes:
   a mobile router radio communication device for establishing, at a given moment, a wireless link with one of the base stations of the at least one communication infrastructures,
   a mobile router storage device having a list of each base router which includes the IP addresses of each base router with the associated communication infrastructures of which the mobile router radio communication device is able to establish the wireless link, and
   a mobile router connection device for initiating a connection with one of the base routers from the list of each base router, after the wireless link has been established, and
wherein each vehicle of the plurality of vehicles includes a single second local network equipped with one of the mobile routers of the plurality of mobile router, an IP address of the second piece of equipment being on the global network, the IP address being private and obtained by concatenating an identifier common to the plurality of vehicles, an identifier of the one vehicle and an identifier of the second piece of equipment on the second local network of the one vehicle on which the second piece of equipment is located, and in that the main and base routing tables storing the identifier of the one vehicle on which the second piece of equipment is located, the main and base routers including a main extracting device and a base extracting device respectively making it possible to extract, from the IP address contained in a header of a datagram to be routed, the identifier of the one vehicle on which the second piece of equipment, to which the datagram is addressed, is located.

* * * * *